(12) United States Patent
Wild et al.

(10) Patent No.: US 9,641,095 B1
(45) Date of Patent: May 2, 2017

(54) POWER CONVERTER OUTPUT STAGE USING HEAT DISSIPATING BUS BARS

(71) Applicant: PAI Capital LLC, San Jose, CA (US)

(72) Inventors: Urs Wild, Bäretswil (CH); Ivan Feno, Bertschikon (CH)

(73) Assignee: PAI CAPITAL LLC, San Jose, CA (US)

(*) Notice: Subject to any disclaimer, the term of this patent is extended or adjusted under 35 U.S.C. 154(b) by 91 days.

(21) Appl. No.: 14/625,120

(22) Filed: Feb. 18, 2015

Related U.S. Application Data

(60) Provisional application No. 61/943,065, filed on Feb. 21, 2014.

(51) Int. Cl.
*H02M 7/217* (2006.01)

(52) U.S. Cl.
CPC .................. *H02M 7/217* (2013.01)

(58) Field of Classification Search
CPC ............ H02M 7/217; H02M 3/33507; H02M 2001/327; H02M 3/33592; H02M 7/003; H01L 25/112; H01L 25/115; H01L 23/34; H01F 2027/406; H05K 7/20927
See application file for complete search history.

(56) References Cited

U.S. PATENT DOCUMENTS

| | | | | |
|---|---|---|---|---|
| 6,002,603 A * | 12/1999 | Carver | .................. | H02M 3/158 363/132 |
| 2003/0142513 A1* | 7/2003 | Vinciarelli | ............. | H02J 1/102 363/17 |
| 2005/0083716 A1* | 4/2005 | Marquardt | ............ | H02M 5/271 363/132 |
| 2005/0254272 A1* | 11/2005 | Vinciarelli | ............ | H02M 3/157 363/65 |
| 2006/0092599 A1* | 5/2006 | Yamamura | ........... | H05K 1/0263 361/611 |
| 2009/0026968 A1* | 1/2009 | Kirchmeier | ....... | H01J 37/32045 315/161 |
| 2013/0107581 A1* | 5/2013 | Krause | .................... | H02M 1/12 363/17 |
| 2015/0036292 A1* | 2/2015 | Rai | .................... | H05K 7/20909 361/692 |

* cited by examiner

*Primary Examiner* — Gustavo Rosario Benitez

(74) *Attorney, Agent, or Firm* — Patterson Intellectual Property Law, P.C.; Mark J. Patterson; Gary L. Montle

(57) ABSTRACT

A dense and efficient output stage for a DC/DC converter includes center tapped secondary windings of a transformer having an offset core with respect to a PCB, two pairs of synchronous rectifiers configured to define two pairs of paralleled symmetrical AC loops respective to the secondary windings, and at least two bus bars disposed within a forced cooling airstream to act as heat sinks for the synchronous rectifiers, while further providing a filtering impedance between the transformer windings and an output capacitance. A split capacitance is disposed in close proximity with the synchronous rectifiers to filter out ripple current, in one embodiment characterized by first and second capacitors each respectively coupled between opposing ends of the first and second bus bars, wherein the bus bars are arranged about at least three sides of the transformer core.

20 Claims, 4 Drawing Sheets

US 9,641,095 B1

POWER CONVERTER OUTPUT STAGE USING HEAT DISSIPATING BUS BARS

CROSS-REFERENCES TO RELATED APPLICATIONS

This application claims benefit of U.S. Provisional Patent Application No. 61/943,065, filed Feb. 21, 2014, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to DC/DC power converters. More particularly, the present invention pertains to the use and configuration of bus bars in an output stage of a DC/DC power converter.

Conventional DC/DC switch mode power converters use synchronous rectification on the output of the transformer isolating the primary and secondary circuits. The synchronous rectifiers are often implemented as MOS transistors in TO-220 electronic component packages attached to a heat sink. In such cases, the transformer and the MOS switches cannot be placed in close proximity to each other. This results in parasitic inductance, further causing ringing and hence overshoot of the voltage across the switches, which again requires an oversizing of the switches. Further, the physical separation of the transformer and the synchronous rectifiers result in significant conduction losses in the wiring.

With this type of package for the synchronous rectifiers, it is typically impractical or even impossible to increase the overall power density of the converter because of the size of the components. Further, the associated parasitic characteristics substantially prohibit an increase in the switching frequency.

It would therefore be desirable to provide new packaging methods in order to significantly increase the power capability of a center tapped DC/DC converter output stage to handle currents above 100 A, and at the same time decrease the space needed for the synchronous rectifiers and have low interconnection losses.

BRIEF SUMMARY OF THE INVENTION

The present invention relates to various embodiments of an inventive combination of a printed circuit board (PCB), a transformer, synchronous rectifiers and at least two bus bars to provide a dense, highly efficient output stage of a DC/DC converter stage, and at the same time provide noise filtering and effective cooling of all devices. Various devices, circuits and methods as disclosed herein efficiently use the space above the PCB to reduce the overall footprint of the high current output stage while exposing the bus bars to the cooling air stream and providing such cooling to the synchronous rectifiers electrically connected to the bus bars.

In one exemplary embodiment of an inventive power supply as disclosed herein for mounting within a housing having a cooling airstream, the power supply includes a transformer core coupled to a printed circuit board via pins associated with center-tapped first and second secondary windings. First and second bus bars are disposed within the cooling airstream and arranged to extend around at least three sides of the transformer core. A ground terminal is coupled to the first bus bar and a positive output terminal is coupled to the second bus bar. First and second switching devices are coupled in series between opposing ends of the first bus bar and to a first common node at the first secondary winding. Third and fourth switching devices are coupled in series between opposing ends of the first bus bar and to a second common node at the second secondary winding. First and second filter capacitors are separately coupled between the first and second bus bars and mounted on the circuit board proximate one or more of the switching devices.

In one exemplary aspect of this embodiment of the power supply, the pins are transversely oriented with respect to a face of the circuit board so as to define a space between the transformer core and the face of the circuit board, the space further defining an airstream corridor.

In another exemplary aspect of this embodiment of the power supply, the switching devices are surface mounted to the circuit board and within the space between the transformer core and the face of the circuit board. The switching devices may further be mounted in close proximity to the first bus bar or the second bus bar. The first and second bus bars act as heat sinks with respect to the switching devices. The switching devices may still further operate to provide synchronous rectification of power supplied via the first and second windings.

In another exemplary aspect of this embodiment of the power supply, a third capacitor is coupled between the first and second bus bars and is mounted on the circuit board proximate the positive output and ground terminals. A capacitance of the third capacitor in combination with a filtering inductance of the second bus bar may further be effective to smooth an output voltage at the output voltage terminal. A magnetic element may further be provided surrounding the second bus bar between the third capacitor and one or more of the first and second capacitors, wherein a filtering inductance of the second bus bar is increased.

In another exemplary aspect of this embodiment of the power supply, the bus bars may be configured to collect an output current which in combination with the filtering inductance of the bus bars produces a substantially DC current through the bus bars. Such a configuration may further define first and second parallel and symmetrical AC loops with respect to opposing sides for each of the first secondary winding and the second secondary winding.

In another exemplary aspect of this embodiment of the power supply, the first capacitor may be coupled between a first end of the first bus bar and a center tap between the first and second secondary windings. The second capacitor may be coupled between a second end of the first bus bar and the center tap. The first and second bus bars may further extend about first, second and third sides of the transformer core, with the first and second ends of the respective first and second bus bars collectively defining an open fourth side. Accordingly, portions of the first and second bus bars corresponding to the second side of the transformer core are positioned transversely with respect to a cooling airflow direction. The first and second switching devices may still further be coupled in series between the first and second ends of the first bus bar.

In one exemplary embodiment of an output stage for a DC/DC power converter configured on a circuit board as disclosed herein, the output stage includes a ground terminal coupled to a first bus bar and a positive output terminal coupled to a second bus bar. An output transformer has a first winding, a second winding, and a center tap coupled to the second bus bar. First and second switching devices are coupled to the first bus bar and to a first common node at the first winding of the output transformer. Third and fourth switching devices are coupled to the first bus bar and to a second common node at the second winding of the output transformer. First and second filter capacitors are coupled between the first and second bus bars and mounted on the circuit board proximate one or more of the switching devices. A third capacitor is coupled between the first and second bus bars and mounted on the circuit board proximate the positive output and ground terminals.

In one exemplary aspect of this embodiment of the output stage, the first bus bar and the second bus bar are configured and arranged on the circuit board to facilitate transference of operating heat from the switching devices to ambient cooling air flowing proximate the circuit board. The first bus bar and the second bus bar may further be configured and arranged on the circuit board to provide effective filtering inductance between the first and second capacitors mounted proximate to the switching devices and the third capacitor mounted proximate the positive output and ground terminals.

In another exemplary aspect of this embodiment of the output stage, first and second parallel and symmetrical AC loops may be defined with respect to opposing sides for each of the first winding and the second winding.

In another exemplary aspect of this embodiment of the output stage, the first filter capacitor may be coupled between a first end of the first bus bar and the center tap of the output transformer. The second filter capacitor may be coupled between a second end of the first bus bar and the center tap of the output transformer. The first and second switching devices may still further be coupled in series between the first and second ends of the first bus bar.

In another exemplary embodiment of an output stage for a DC/DC power converter configured on a circuit board as disclosed herein, the output stage may include an output transformer having a magnetic core separated from the circuit board via pins associated with first and second secondary windings. A ground terminal is coupled to a first bus bar and a positive output terminal is coupled to a second bus bar. A first branch includes first and second switching devices coupled in series between first and second ends of the first bus bar with a common node coupled to the first transformer winding. A second branch includes third and fourth switching devices coupled in series between the first and second ends of the first bus bar with a common node coupled to the second transformer winding. A third branch includes first and second capacitors coupled in series between the first and second ends of the first bus bar with a common node coupled to a center tap between the first and second transformer windings.

BRIEF DESCRIPTION OF THE SEVERAL VIEWS OF THE DRAWINGS

FIG. 4b is side view of the output stage arrangement shown in FIG. 4a.

DETAILED DESCRIPTION OF THE INVENTION

Figure 1:
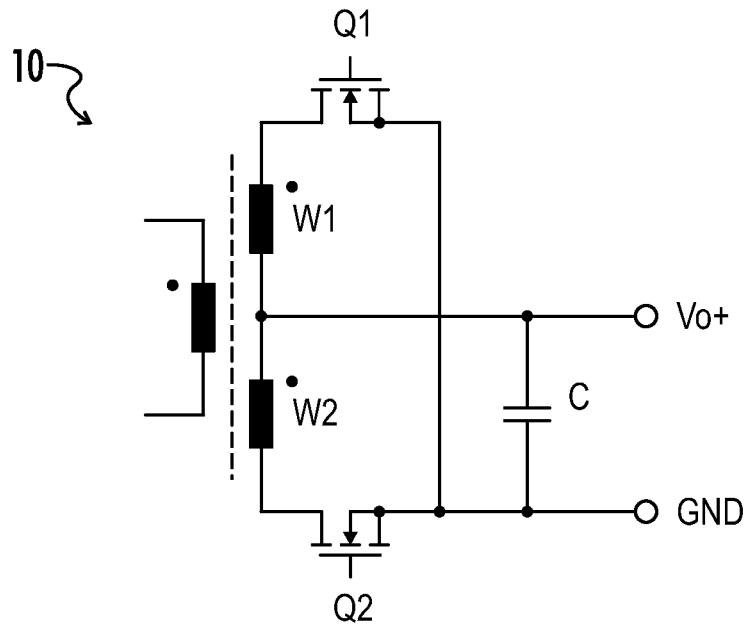
FIG. 1 is a basic circuit diagram of an output stage of a conventional DC/DC converter.

Where the various figures may describe embodiments sharing various common elements and features with other embodiments, similar elements and features are given the same reference numerals and redundant description thereof may be omitted below.

In various embodiments, a switched mode power supply as described herein may typically be implemented for or otherwise incorporated within a power shelf or an equivalent rack-mount structure by which DC power may be provided to, for example, power servers, storage or networking equipment. An exemplary power shelf may typically include or otherwise be placed in proximity to a cooling fan network to generate a forced cooling airstream across the power supply, for example drawing or pushing cool air through the system to replace or otherwise transfer heated air from the electrical components.

Various embodiments of the power supply may include an input power source, an input power stage further including a power conversion circuit such as for example a power factor correction circuit, a transformer having one or more primary windings electrically coupled to switching elements of the input stage, and one or more secondary windings magnetically coupled to the primary windings and electrically coupled to an isolated output stage. The terms "power converter" and "power conversion circuit" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion as known to one of skill in the art.

FIG. 1 shows a basic circuit diagram of an output stage of a conventional DC/DC converter with center tapped output windings W1, W2 and active synchronous rectifiers Q1 and Q2 connected to each end of the center tapped winding. A capacitor C filters the output voltage and acts as a storage/filter element for the ripple current out of the transformer.

Figure 2:
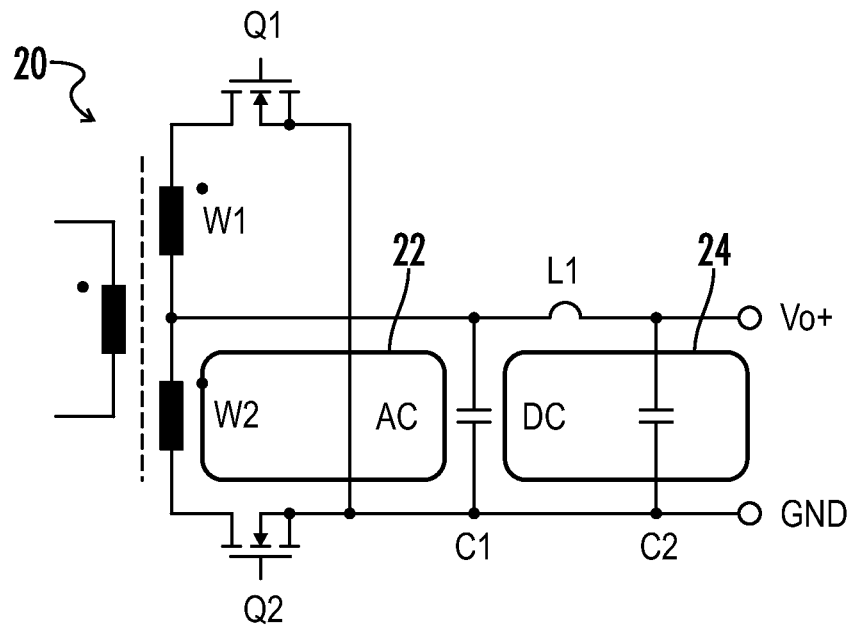
FIG. 2 is a circuit diagram of the output stage according to FIG. 1 with an additional filter inductor L1 and capacitor C2 dividing the circuit into an AC and DC loop.

FIG. 2 shows an exemplary circuit diagram of the output stage according to FIG. 1, with an additional filter inductor L1 and capacitor C2 dividing the circuit into: (1) an AC loop, in which a combination of DC and AC currents are typically flowing and therefore is highly susceptible to skin and proximity effects; and (2) a DC loop with substantially only DC current flowing. Particularly when having a single stage delivering more than 100 A of output current at a switching frequency of >150 kHz, it is typically one objective of the designer to keep the AC-loop physical extension as small as possible to limit losses and additional leakage inductances. In the DC-loop, the conductor cross section may be of primary importance to limit the conductor losses.

Figure 3:
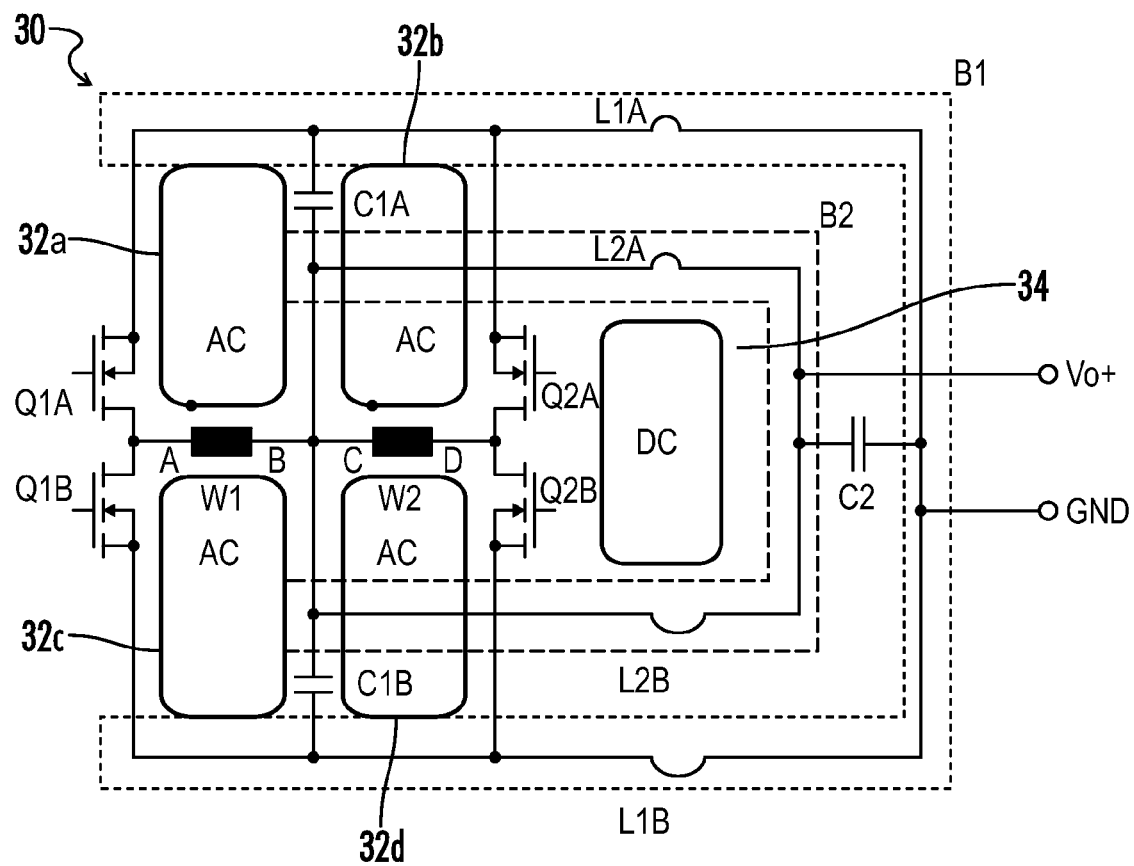
FIG. 3 is a circuit diagram of an embodiment of a power converter output stage according to the present invention.

Referring now to FIG. 3, an embodiment of an output stage 30 according to the present invention is similar in topology to the output stage shown in FIG. 2, but is configured so as to be completely symmetrical around the transformer windings W1, W2 and splits the capacitor C1 into two capacitors C1A and C1B, or otherwise two sets of capacitors representing two capacitances C1A and C1B. At least two bus bars B1 and B2 are arranged in a substantially U-shaped configuration so as to extend about essentially three sides of the transformer core. The bus bars collect the positive and return currents and, because of their physical lengths, provide some filter inductance (L1/L2) between the split capacitance C1A, C1B, and output capacitor C2.

A synchronous rectifier circuit according to the present invention is provided with switching devices which are connected in parallel but arranged symmetrically about the transformer. In an embodiment as represented in FIG. 3, the rectifier circuit includes at least a first switching device Q1 and a second switching device Q2. The first switching device Q1 may be split into at least a pair of switching elements Q1A, Q1B. The switching elements may be coupled on respective first ends to opposing ends of the first (i.e., negative) bus bar B1, and on respective second ends to a first end (A) of the first winding W1. Likewise, the second switching device Q2 may be split into at least a pair of switching elements Q2A, Q2B connected in parallel but arranged symmetrically about the transformer, with the switching elements being coupled on respective first ends to opposing ends of the first (i.e., negative) bus bar B1, and on respective second ends to a first end (D) of the second winding W2.

In various embodiments the respective switching devices Q1, Q2 may themselves be formed of multiple switching devices coupled in parallel but otherwise remaining structurally defined so as to be symmetrically arranged around the transformer and maintaining equivalent connections as a single switching device with respect to the bus bar B1. Such an embodiment may be illustrated in FIG. 4A wherein for example switching device Q1 is formed of three switching devices having respective first and second switching elements Q1A (3x), Q1B (3x).

A second end (B) of the first winding W1 and a second end (C) of the second winding W2 are center-tapped at a node $W1_B$-$W2_C$ between the split capacitance C1. A first capacitor C1A is coupled between the center tap and the negative bus bar B1. A second capacitor C1B is coupled between the center tap and the negative bus bar B1. The second (positive) bus bar B2 is coupled on its opposing ends to the center tap $W1_B$-$W2_C$. The capacitor C1A is coupled between first respective ends of the positive and negative bus bars and the capacitor C1B is coupled between second respective ends of the positive and negative bus bars.

As noted above, the output stage of FIG. 2 may be characterized by an "AC loop" with undesirable resultant losses and leakage inductances. One of skill in the art may further appreciate that each of two AC loops for an output stage in an embodiment as represented in FIG. 3 is divided into two paralleled, symmetrical AC loops (represented as 32a, 32b, 32c, 32d) which effectively decreases the current in each of the loops by half, further thereby reducing the losses in the PCB interconnection between the transformer and the respective synchronous rectifier switching elements to approximately one half as well.

An output terminal Vo+ is coupled to the second bus bar B2 and a circuit ground GND is coupled to the first bus bar B1. The output capacitor C2 is coupled between the first and second bus bars B1, B2, proximate the output terminal Vo+ and the circuit ground GND, respectively.

Figure 4A:
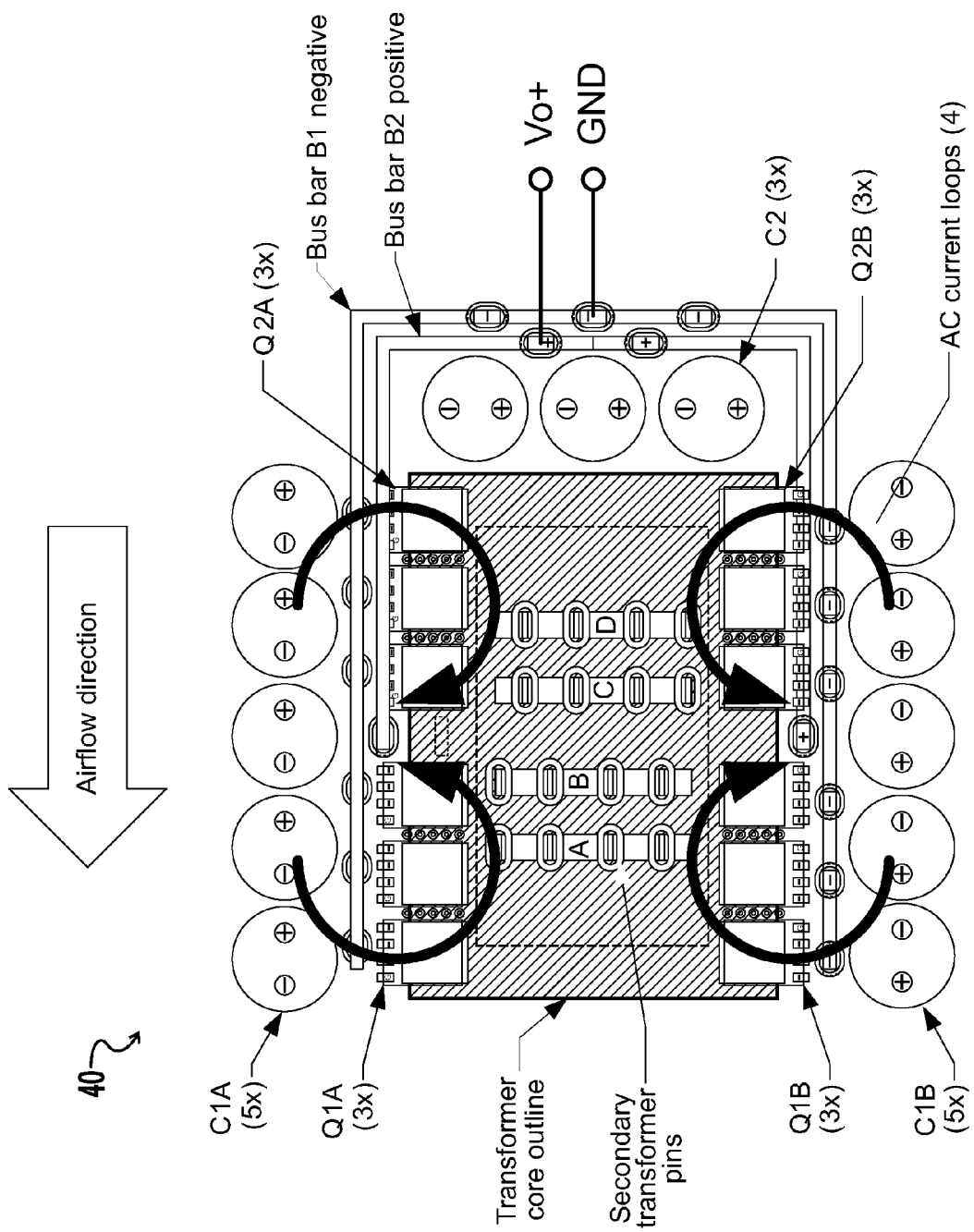
FIG. 4a is a plan view of the output stage shown in FIG. 3, depicting the physical arrangement of the output stage components.
Figure 4B:
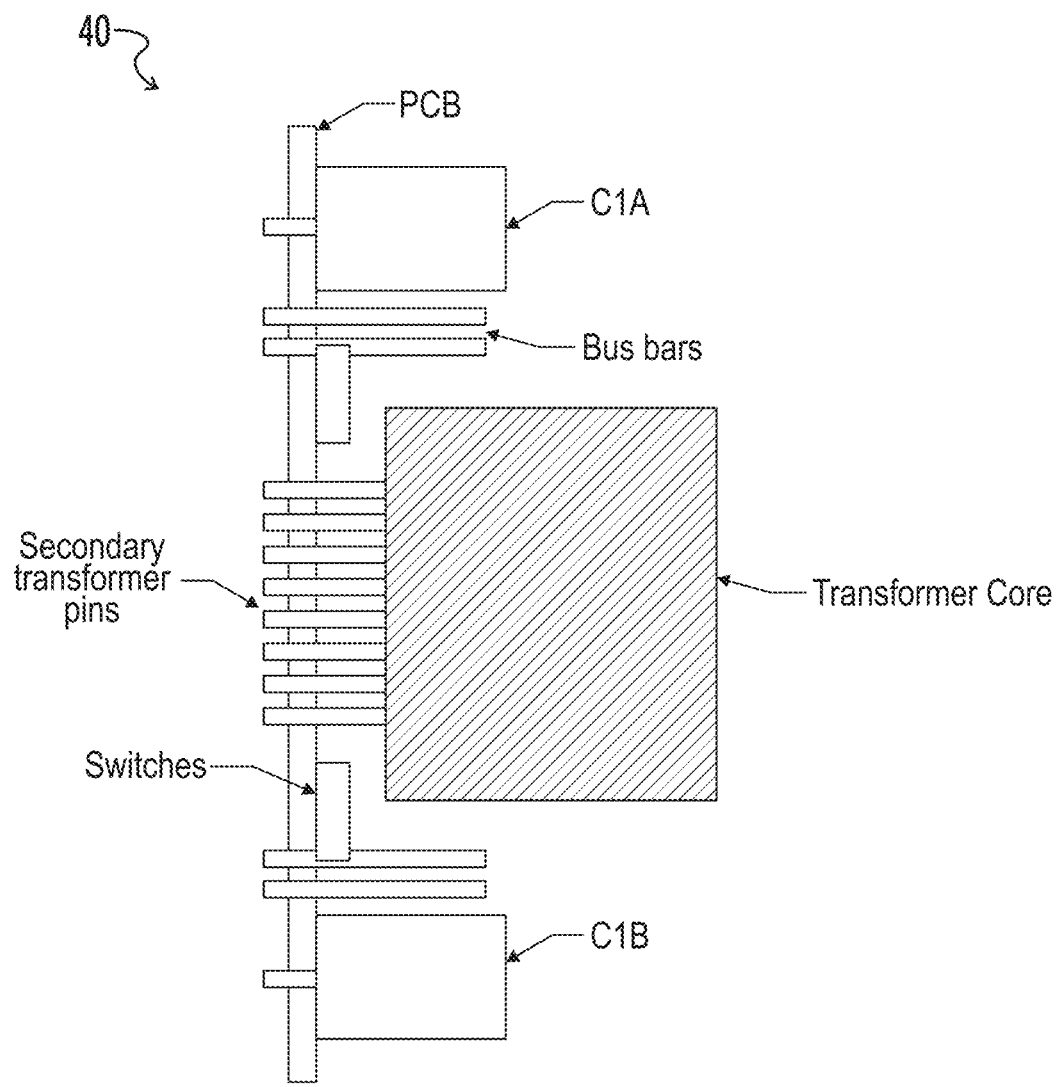

One embodiment of a packaging configuration for the output stage shown in FIG. 3 is illustrated in FIGS. 4a and 4b. A printed circuit board (PCB) provides the main mechanical support and interconnects the components. The transformer includes vertical windings with the winding connections going directly into the PCB. There are two sets of switches, for example MOSFET devices acting as synchronous rectifiers Q1A, Q2A, Q1B, and Q2B in surface mount packages. The first set of capacitors C1A, C1B is placed in close proximity to each of the synchronous rectifiers Q1A, Q2A, Q1B, and Q2B to filter out the ripple current, preferably realized as ceramic or low ESR polymer capacitors or a combination thereof.

The two bus bars B1, B2 provide greater conductor cross-section for reduced conduction losses while also acting as heat sinks for the synchronous rectifiers by being placed in the forced cooling airstream. The bus bars have an inherent inductance just by their physical length from one end to the other, thereby acting in various embodiments to provide filtering impedance (L1A/L1B/L2A/L2B).

The second set of capacitors C2 is configured at a distal portion of the bus bars B1, B2 with respect to the opposing ends (as associated for example with the synchronous rectifiers and the first set of capacitors C1A, C1B) and are effective to provide a smooth output voltage in conjunction with the filtering inductance of the bus bars B1, B2.

In certain embodiments, a magnetic core may be provided around the bus bars B1, B2 between capacitors C1 and C2 to further increase the filter inductance of the bus bars.

In embodiments of a power supply 40 having the output stage as disclosed herein, such as that represented in FIGS. 4a and 4b, the synchronous rectifiers are placed below the magnetic core, thereby saving overall space and effectively increasing the power density. The AC loop size may further be substantially minimized, wherein power losses are reduced.

In various embodiments as disclosed herein, the bus bars B1, B2 collect the output current and with their physical extension provide some filter inductance which effectively results in a DC current through the bus bars. As the bus bars are further connected in close proximity to the synchronous rectifiers, they act therefore as a heat sink to the synchronous rectifier as the bus bars themselves are cooled in the airstream of the power supply.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element" and "switch" as described herein and as shown in the corresponding figures may refer to any of a variety of transistors as known in the art (including but not limited to FET, BJT, IGBT, JFET, etc.), but it is anticipated that in various alternative embodiments of the present disclosure these terms may encompass: a switching diode, a silicon controlled rectifier (SCR), a diode for alternating current (DIAC), a triode for alternating current (TRIAC), a mechanical single pole/double pole switch (SPDT), or electrical, solid state or reed relays, and the like. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A power supply configured for mounting within a housing having a cooling airstream, the power supply comprising:
    a transformer core coupled to a printed circuit board via pins associated with first and second secondary windings;
    first and second bus bars positioned to be disposed within the cooling airstream and arranged to extend about at least three sides of the transformer core;
    a ground terminal coupled to the first bus bar and a positive output terminal coupled to the second bus bar;
    first and second switching devices coupled to the first bus bar and to a first common node at the first secondary winding;
    third and fourth switching devices coupled to the first bus bar and to a second common node at the second secondary winding;
    a first filtering capacitor coupled between the first and second bus bars and mounted on the printed circuit board proximate one or more of the switching devices; and
    a second filtering capacitor coupled between the first and second bus bars and mounted on the printed circuit board proximate one or more of the switching devices.

2. The power supply of claim 1, wherein the pins are transversely oriented with respect to a face of the printed circuit board so as to define a space between the transformer core and the face of the printed circuit board, the space further defining an airstream corridor.

3. The power supply of claim 2, wherein the first, second, third and fourth switching devices are surface mounted to the printed circuit board and within the space between the transformer core and the face of the printed circuit board.

4. The power supply of claim 3, wherein each of the first, second, third and fourth switching devices comprises two or more switching devices connected in parallel.

5. The power supply of claim 3, wherein each of the first, second, third and fourth switching devices are mounted in close proximity to the first bus bar or the second bus bar, and wherein the first and second bus bars act as heat sinks with respect to the switching devices.

6. The power supply of claim 5, wherein the first, second, third and fourth switching devices operate to provide active synchronous rectification of power supplied via the first and second windings.

7. The power supply of claim 1, further comprising a third capacitor coupled between the first and second bus bars and mounted on the printed circuit board proximate the positive output and ground terminals.

8. The power supply of claim 7, wherein a capacitance of the third capacitor in combination with a filtering inductance of the second bus bar is effective to smooth an output voltage at the output voltage terminal.

9. The power supply of claim 8, further comprising a magnetic device surrounding the second bus bar between the third capacitor and one or more of the first and second capacitors, wherein a filtering inductance of the second bus bar is increased.

10. The power supply of claim 1, wherein the bus bars collect an output current which in combination with the filtering inductance of the bus bars produces substantially DC current through the bus bars, and further wherein first and second parallel and symmetrical AC loops are defined with respect to opposing sides for each of the first secondary winding and the second secondary winding.

11. The power supply of claim 1, wherein the first capacitor is coupled between a first end of the first bus bar and a center tap between the first and second secondary windings, and the second capacitor is coupled between a second end of the first bus bar and the center tap.

12. The power supply of claim 11, wherein the first and second bus bars extend about first, second and third sides of the transformer core;
    first and second ends of the respective first and second bus bars collectively define an open fourth side; and
    portions of the first and second bus bars corresponding to the second side of the transformer core are positioned transversely with respect to a cooling airflow direction.

13. The power supply of claim 12, wherein the first and second switching devices are coupled in series between the first and second ends of the first bus bar.

14. An output stage for a DC/DC power converter configured on a circuit board, the output stage comprising:
    a ground terminal coupled to a first bus bar and a positive output terminal coupled to a second bus bar;
    an output transformer having a first winding, a second winding, and a center tap, wherein the center tap is coupled to the second bus bar;
    first and second switching devices coupled on opposing first ends to the first bus bar and on respective second ends to a first common node at the first winding of the output transformer;
    third and fourth switching devices coupled on opposing first ends to the first bus bar and on respective second ends to a second common node at the second winding of the output transformer;
    a first filter capacitor coupled between the first and second bus bars and mounted on the circuit board proximate one or more of the switching devices;
    a second filter capacitor coupled between the first and second bus bars and mounted on the circuit board proximate one or more of the switching devices; and
    a third capacitor coupled between the first and second bus bars and mounted on the circuit board proximate the positive output and ground terminals,
    wherein the first bus bar and the second bus bar are configured and arranged on the circuit board to facilitate transference of operating heat from the first, second, third and fourth switching devices to ambient cooling air flowing proximate the circuit board.

15. The output stage of claim 14, wherein the first bus bar and the second bus bar are configured and arranged on the circuit board to provide effective filtering inductance between the first and second capacitors mounted proximate to the first, second, third and fourth switching devices and the third capacitor mounted proximate the positive output and ground terminals.

16. The output stage of claim 14, wherein first and second parallel and symmetrical AC loops are defined with respect to opposing sides for each of the first winding and the second winding.

17. The output stage of claim 14, wherein the first filter capacitor is coupled between a first end of the first bus bar and the center tap of the output transformer, and the second filter capacitor is coupled between a second end of the first bus bar and the center tap of the output transformer.

18. The output stage of claim 17, wherein the first and second switching devices are coupled in series between the first and second ends of the first bus bar.

19. An output stage for a DC/DC power converter configured on a circuit board, the output stage comprising:
   a ground terminal coupled to a first bus bar and a positive output terminal coupled to a second bus bar;
   an output transformer having a first winding, a second winding, and a center tap, wherein the center tap is coupled to the second bus bar;
   first and second switching devices coupled on opposing first ends to the first bus bar and on respective second ends to a first common node at the first winding of the output transformer;
   third and fourth switching devices coupled on opposing first ends to the first bus bar and on respective second ends to a second common node at the second winding of the output transformer;
   a first filter capacitor coupled between the first and second bus bars and mounted on the circuit board proximate one or more of the switching devices;
   a second filter capacitor coupled between the first and second bus bars and mounted on the circuit board proximate one or more of the switching devices; and
   a third capacitor coupled between the first and second bus bars and mounted on the circuit board proximate the positive output and ground terminals,
   wherein the first filter capacitor is coupled between a first end of the first bus bar and the center tap of the output transformer, and the second filter capacitor is coupled between a second end of the first bus bar and the center tap of the output transformer.

20. The output stage of claim 19, wherein the first and second switching devices are coupled in series between the first and second ends of the first bus bar.

* * * * *